United States Patent
Garcia

[19]

[11] Patent Number: 5,860,660
[45] Date of Patent: Jan. 19, 1999

[54] BICYCLE WITH PRESSURE REGULATORS ON THE WHEELS AND SHOCK ABSORBERS

[76] Inventor: Justiniano Garcia Garcia, Currican 7-Bungalow 21, 03540 Playa San Juan, Spain

[21] Appl. No.: 797,416

[22] Filed: Feb. 10, 1997

[30] Foreign Application Priority Data

Feb. 8, 1997 [ES] Spain ................................ 9600313

[51] Int. Cl.$^6$ .................................................. B62K 3/02
[52] U.S. Cl. ........................................ 280/201; 280/281.1
[58] Field of Search .................................. 280/201, 212, 280/216, 274, 281.1, 288.3, 288.4, 304.2

[56] References Cited

U.S. PATENT DOCUMENTS

| | | | |
|---|---|---|---|
| 631,773 | 8/1899 | Bubb | 280/201 |
| 4,568,097 | 2/1986 | Farooq | 280/216 |
| 5,098,114 | 3/1992 | Jones | 280/284 |
| 5,143,390 | 9/1992 | Goldsmith | 280/201 |
| 5,342,177 | 8/1994 | Cheng | 280/304.2 |

FOREIGN PATENT DOCUMENTS

96/22216  7/1996  WIPO .

*Primary Examiner*—Kevin Hurley
*Attorney, Agent, or Firm*—Ostrolenk, Faber, Gerb & Soffen, LLP

[57] ABSTRACT

An improved bicycle with pressure regulators on the wheels and shock absorbers, with five pressure gauges located on the handlebars which continuously measure the pressure existing in a depository configured on the frame, the tires of the wheels, and shock absorbers, located respectively in the front and rear zone. The pressure gauges are connected to the depository and to the tires and to the shock absorbers through flexible tubes. Each pressure gauge has a support provided with two push-buttons, by means of which pressure is added to the tires or shock absorbers, or the pressure is reduced therein, the air contained in the depository going to the shock absorbers and the tires.

11 Claims, 4 Drawing Sheets

BICYCLE WITH PRESSURE REGULATORS ON THE WHEELS AND SHOCK ABSORBERS

BACKGROUND AND SUMMARY OF THE INVENTION

The present specification refers to an improved bicycle with pressure regulators on the wheels and shock absorbers. The clear purpose of this is to enable the user of the bicycle to directly regulate the air contained in the wheels of the bicycle and the air contained in the shock absorbers, to reduce or increase the pressure of these elements in accordance with the emission of air towards the wheels or towards the shock absorbers of air contained within the frame of the bicycle itself. The wheels or shock absorbers act as a depository containing pressurized air. The bicycle has pressure gauges which indicate the pressure existing in the wheels and in the shock absorbers, and a pressure gauge which indicates the air contained in the depository formed by the frame itself.

The improved bicycle has pressure regulators on the wheels and shock absorbers. Air is contained within the bicycle frame, which acts as a depository of air. A proportionate quantity of air can be emitted towards the wheels or towards the shock absorbers, thereby increasing the air pressure at those elements. Depending on the action of the cyclist operating some push-buttons at the handlebars, one can also emit the contained air from the shock absorbers or from the wheels, in order to adapt them to the characteristics of the terrain on which one is traveling.

The improved bicycle with pressure regulators on the wheels and shock absorbers is based upon a conventional bicycle, preferably a mountain bicycle, the frame of which is configured as a depository containing pressurized air. The frame has the appropriate load or intake valve and the appropriate discharge valve. The depository is connected to five pressure gauges that indicate, respectively, the air pressure contained within the depository, the air pressures contained within the front wheel and the rear wheel and, in addition, the air pressures contained in the front and rear shock absorbers.

Associated with each of the pressure gauges, except for the frame, are operating devices including push buttons that, depending on their mounting and direct action on the pressure gauges of the wheels and shock absorbers, cause one of the entry of air in the wheels or in the shock absorbers upon pushing on one button or the like, while, upon acting on the other push-button, they cause the emission of the contained air. These actions are adapted to the characteristics of the terrain on which the cyclist is traveling.

The fifth pressure gauge continuously indicates the air contained within the depository.

To summarize, when a cyclist is traveling on terrain with suitable characteristics, it is necessary for the shock absorbers and wheels to have the appropriate pressure in order to travel properly. The cyclist will increase the appropriate pressure of the tires and shock absorbers. But once they cyclist leaves the terrain which requires greater pressure or hardness in the cited elements, he needs to travel with lower pressure. The cyclist then appropriately acts on the push-buttons and emits from the wheels and from the shock absorbers the amount of air necessary in order to travel ideally.

BRIEF DESCRIPTION OF THE DRAWINGS

To explain the invention, drawings are attached for illustration and not for limitation, the following is shown.

PREFERRED EMBODIMENTS OF THE INVENTION

Figure 1:
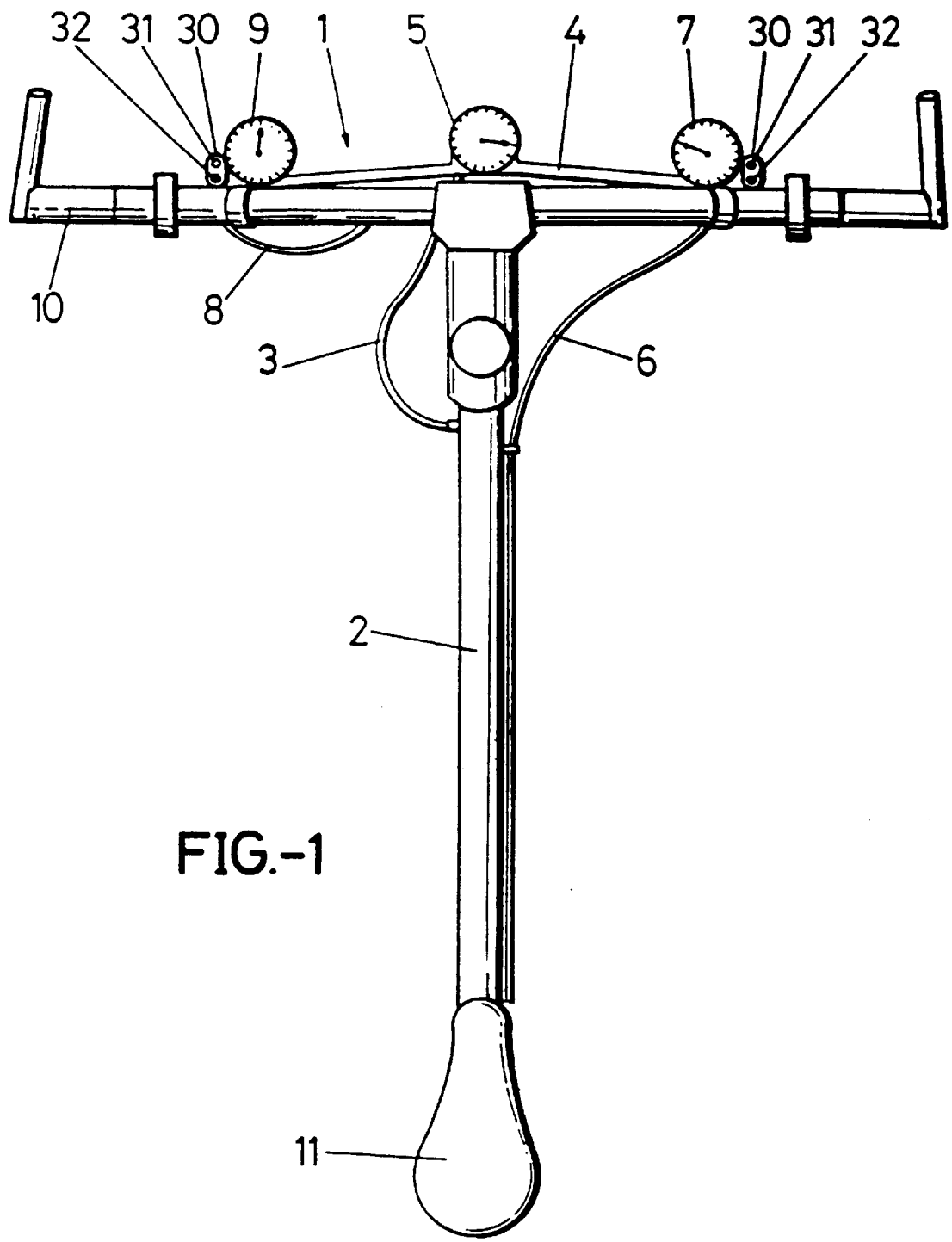
FIG. 1 is a plan view of the improved bicycle with pressure regulators on the wheels and on the shock absorbers according to the invention.
Figure 2:
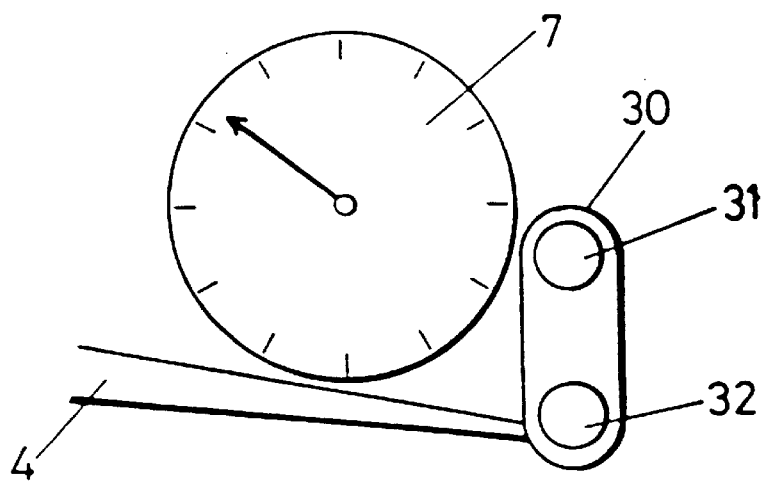
FIG. 2 schematically shows one of the pressure gauges, and next to it, the push-buttons for entry of air into or removal of air from the wheels or shock absorbers.

FIG. 1 shows the improved bicycle 1 with pressure regulators on the wheels and on the shock absorbers. It starts with a conventional bicycle. The bicycle frame 2 is hollow and configured as an air depository, having an air intake valve 22, shown in FIG. 8, and an excess pressure emitter valve 14, shown in detail in FIG. 5, all included in the frame 2 of the bicycle 1 in FIG. 8.

The handlebars 10, incorporate a support 4, whose purpose is to support three pressure gauges 5, 7 and 9. The gauges are intended, respectively, to enable viewing the pressure of the air contained in the frame 2, configured as a depository, and the pressures in the rear and the front wheels.

The pressure gauges 7 and 9 have supports 30 located to the side of each gauge. Each support is provided with two push-buttons 31 and 32 intended by their operation, respectively, to cause emission of some of the air contained in the front and rear tires or to cause entry of some air contained in the depository 2 into the front and rear wheels.

The front and rear wheels are connected by flexible tubes 6, 8 for maintaining the same or related pressures in the wheels, while the pressure gauge 5 is connected to the depository 2 by a flexible tube 3.

Figure 3:
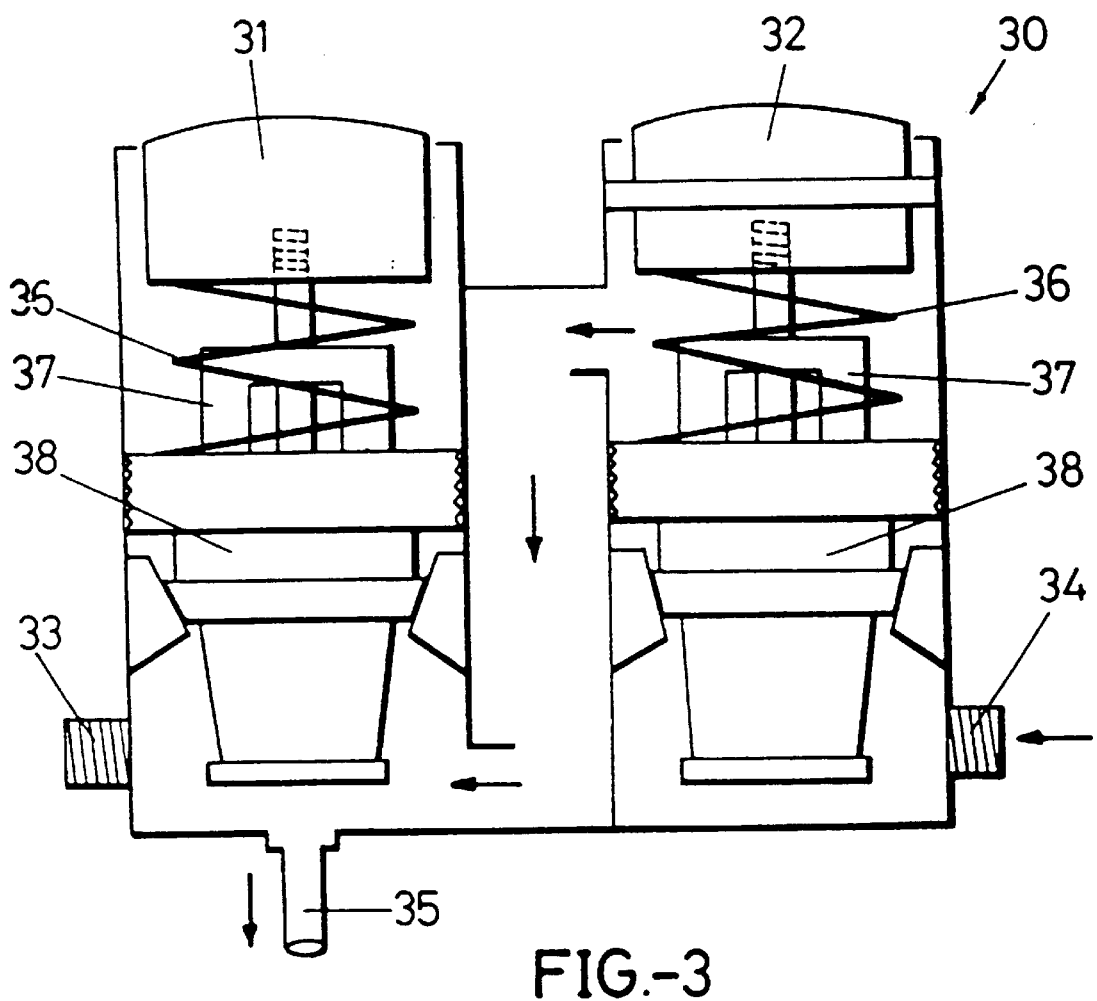
FIG. 3 shows a section view of the push-buttons for action on the wheels and shock absorbers, to cause air to enter or be removed from the wheels or shock absorbers.

In FIG. 3, the body 30 located on the side of each pressure gauge 7 and 9 has on its inside some springs 36 and a central body 37, which causes the intake or outlet of air depending on the action of the cyclist on the push-buttons 31 and 32. It also contains an air intake 34, an emitter 35 and an intake or outlet connection 33.

Upon a push-button 31 or 32 being depressed, the pressure of the spring 36 reacts, the central joint part 37 is mobilized, and beyond the body 38 there are sealed areas in order to facilitate the outlet or intake of air, respectively.

Figure 4:
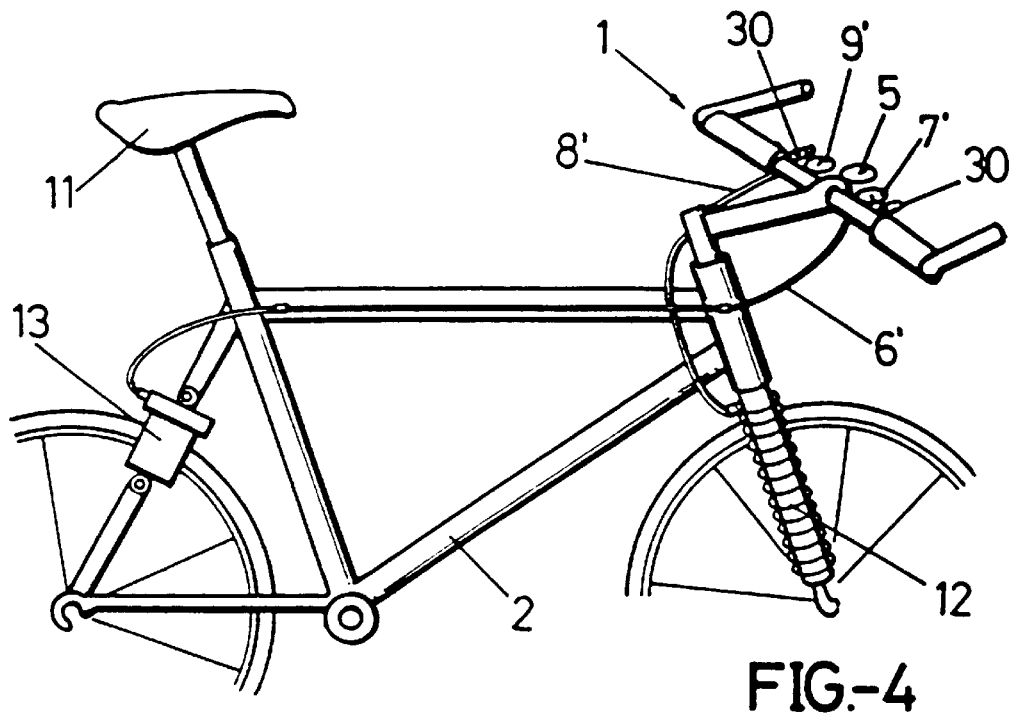
FIG. 4 is a partial perspective view of a bicycle, showing pressure gauges with their push-buttons on the side.

FIG. 4 shows that the bicycle 1 includes an appropriate seat 11. The handlebars 10 of the bicycle support an appropriate pressure gauge 5, which is connected to the depository 2. The gauge 5 is on the frame. Appropriate flexible connectors 6' and 8' are connected to the pressure gauges 7', 9', to introduce air into the rear shock absorber 13 or the front shock absorber 12, or to remove air from these shock-absorbing elements, to adapt the bicycle to the characteristics of the terrain on which the cyclist is traveling. Each of pressure gauge 7' and 9' is disposed near the respective body 30, on which the push-buttons 31, 32 are located.

Figure 5:
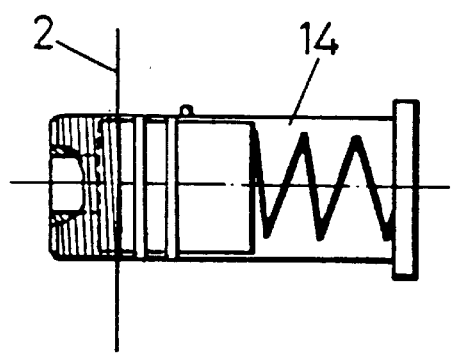
FIG. 5 shows a detail in section of the air regulator or valve for discharge of the excess air pressure contained within the depository of the bicycle frame.

FIG. 5 shows the emission valve 14, which is fixed on the frame 2. It acts for the depository to automatically alleviate excess pressure that may exist in the depository.

Figure 6:
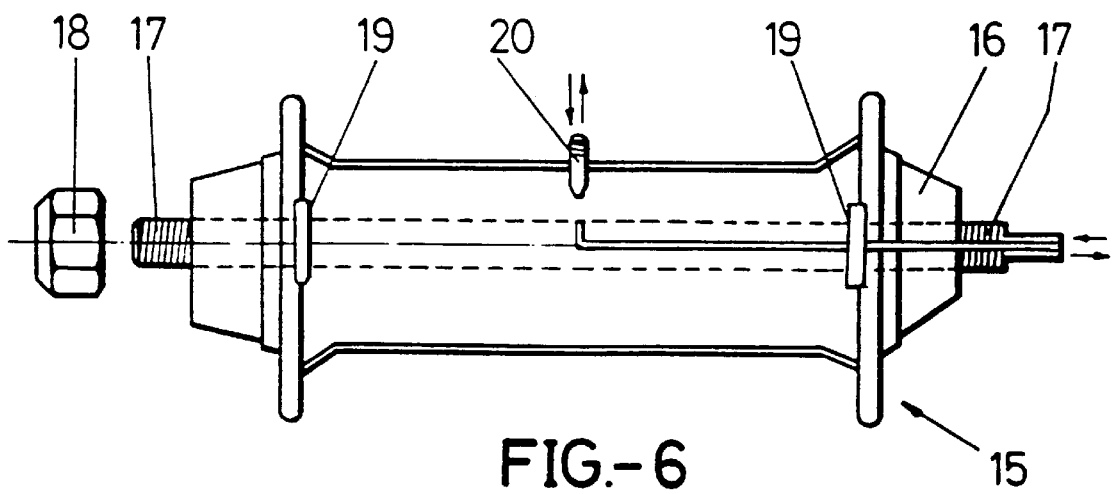
FIG. 6 shows section through a sleeve or hub of a wheels.

FIG. 6 shows a sleeve 15 or a wheel hub through which the tire is fed air and through which air removed from the tire exits. The sleeve has an air outlet 20, appropriate sealing elements 19 which prohibit the air from exiting outside except through the proper channels. The sleeve is disposed on the frame attachment elements 17 and held on the frame by conventional nuts 18. The air outlet 20 is connected to the conventional air valve of the respective tire, by which air enters and leaves the tire.

Figure 7:
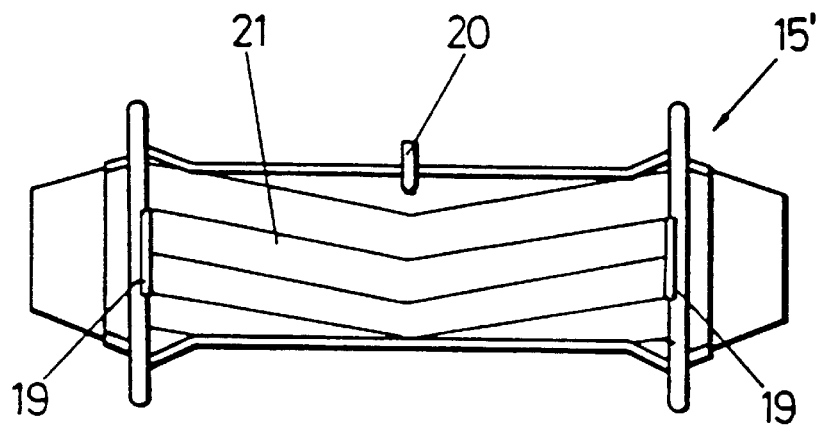
FIG. 7 shows a variant of a wheel attachment sleeve or hub.

FIG. 7 shows an alternate attachment sleeve 15' which includes the appropriate sealing elements 19, an air outlet 20, and the internal area 21, suitably configured so as to achieve internal lubrication. It has a mechanized area in its interior through which oil is dispersed for lubricating the interior.

Figure 8:
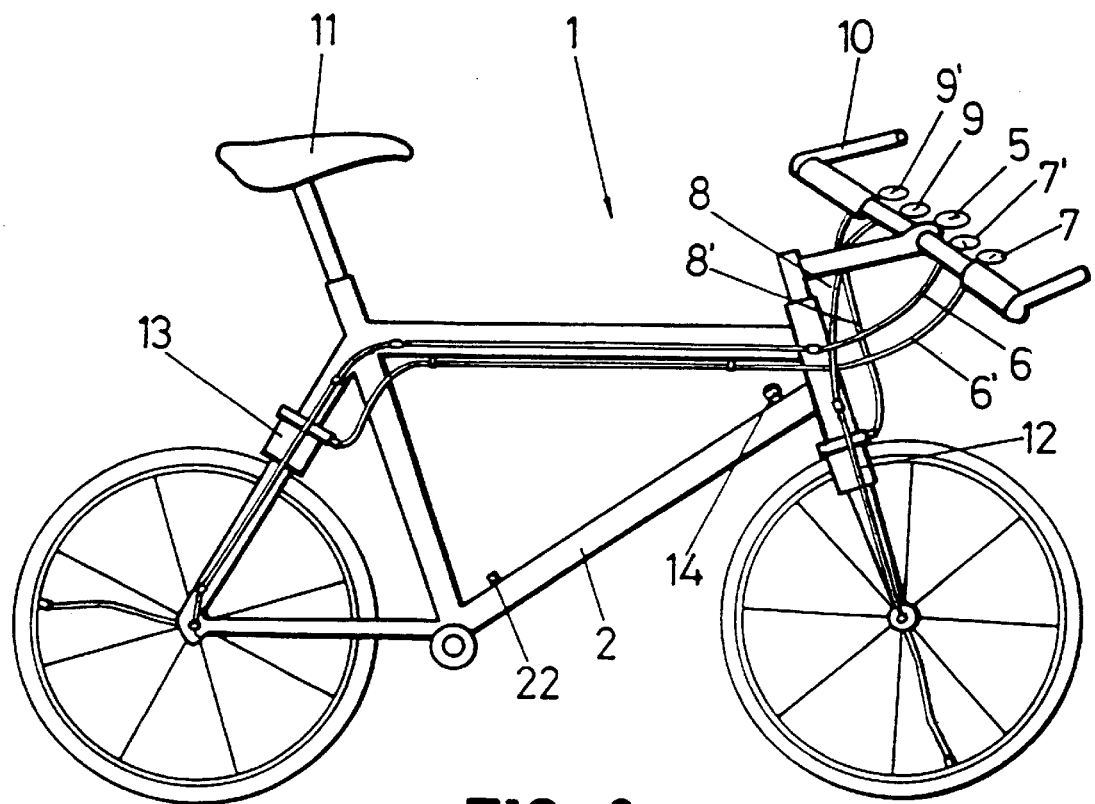
FIG. 8 shows a side view of a bicycle, the handlebars of which are seen in perspective, including the pressure gauges.

The bicycle 1 shown in FIG. 8 has a frame 2 which acts as a depository for containing compressed air. It is provided with an expansion valve or excess air pressure outlet valve 14, an intake valve 22, and five pressure gauges 5, 7, 7', 9, 9' on its handlebars 10, whose connections to the frame 3, and to the tires and shock absorbers 6, 6', 8, 8' is shown by the tubes. This provides for direct action on the wheels and shock absorbers, while having a pressure gauge from which one knows the pressure existing within the depository configured as the frame.

With this specification, it is believed that a person skilled in the art understands the scope of the invention and the advantages derived therefrom.

The materials, form, size and arrangement of the elements may be changed provided that this does not produce a change in the essential nature of the invention.

Although the present invention has been described in relation to a particular embodiment thereof, many other variations and modifications and other uses will be come apparent to those skilled in the art. It is preferred, therefore that the present invention be limited not by the specific disclosure herein, but only by the appended claims.

What is claimed is:

1. A bicycle with pressure regulators on at the wheels and on the shock absorbers at the wheels, wherein the bicycle includes a frame that is hollow in order to act as a depository for containing air, an air intake to the frame, an air outlet from the frame through which air in excess of a desired volume exits from the frame;

wheels with tires and including pneumatic shock absorbers, a seat on the frame for the cyclist;

pressure gauges on the bicycle for making continuous measurements in the tires and in the respective shock absorbers at the wheels: a connection between one gauge and the frame for measuring the pressures existing in the depository of the bicycle frame; another connection between another gauge and the tires; yet another connection between yet another gauge and the shock absorbers;

operating devices near the gauges for being operated to selectively add or reduce pressure at the tires and the shock absorbers and connecting the air containing the depository of the frame to the shock absorbers and the tires for supplying pressure thereto.

2. The bicycle of claim 1, wherein the connections between the respective gauges and each of the depository, the tires and the shock absorbers comprise flexible tubes providing pressure connections between them.

3. The bicycle of claim 1, wherein each of the operating devices comprises first and second push buttons, with the respective first push button operated for causing an increase in pressure of the tire and the shock absorber from the pressure contained in the depository and with the respective second button operated for causing relief of pressure from the tire in the shock absorbers.

4. The bicycle of claim 3, wherein the gauges and the operating devices are disposed on the handlebars of the bicycle.

5. The bicycle of claim 1, wherein the gauges and the operating devices are disposed on the handlebars of the bicycle.

6. The bicycle of claim 1, wherein the air intake to the depository of the frame comprises an intake valve and the outlet from the frame comprises an expansion valve through which air exits to the outside of the frame.

7. The bicycle of claim 1, wherein the seat is a conventional seat supported on the frame so that the height thereof can be regulated.

8. The bicycle of claim 5, further comprising a support for the push button operating devices the support for the operating devices comprises a support body located on the handlebars on which the pressure gauges and the operating devices are supported.

9. The bicycle of claim 2, further comprising hollow sleeves at the wheels with sealing joints within the hollow sleeves; internal air channels to which the flexible air tires are connected and the internal air channels having exterior outlets connected to the conventional air valve of the respective wheels.

10. The bicycle of claim 9, wherein the sleeve includes a mechanized area in its interior through which oil is dispersed for lubricating the interior.

11. The bicycle of claim 3, wherein each of the push buttons has an interior with a spring therein, a body in the interior of the push button on which the spring applies a constant pressure and which is connected to the push button, and the internal sealing element respectively including one of an air intake and an air outlet.

* * * * *